United States Patent [19]

Hope et al.

[11] 4,347,697

[45] Sep. 7, 1982

[54] CONTROL OF A SUPPORT FILAMENT FOR OPTICAL WAVEGUIDES

[75] Inventors: Thomasz S. Hope, Kanata; Miguel Fombellida, Ottawa, both of Canada

[73] Assignee: Northern Telecom Limited, Montreal, Canada

[21] Appl. No.: 208,838

[22] Filed: Nov. 20, 1980

[51] Int. Cl.³ ............... D02G 3/44; D01H 13/04; G02B 5/16

[52] U.S. Cl. ............... 57/9; 57/352

[58] Field of Search ............... 57/3, 6, 11, 12, 9, 57/13, 15, 16, 17, 18, 249, 293, 352, 361

[56] References Cited

U.S. PATENT DOCUMENTS

| | | | |
|---|---|---|---|
| 2,501,457 | 3/1950 | Thelin | 57/9 X |
| 4,154,049 | 5/1979 | King et al. | 57/352 X |
| 4,195,468 | 4/1980 | King et al. | 57/9 |
| 4,205,899 | 6/1980 | King et al. | 57/9 X |
| 4,237,687 | 12/1980 | Vechis et al. | 57/361 |
| 4,248,035 | 2/1981 | Skillen et al. | 57/6 |

*Primary Examiner*—Donald Watkins
*Attorney, Agent, or Firm*—R. J. Austin

[57] ABSTRACT

A device and method for limiting the amount of twist in a support filament as elongate transmission elements are being laid into sinusoidal grooves in the filament. The device has a groove follower in which a probe extends into a groove whereby the follower rotates around the filament, dependent upon the sinuous movement of the groove. A limiting means prevents rotational movement of the follower and probe beyond specified points of rotation and this is sufficient to restrain the filament from further twisting beyond these points.

12 Claims, 5 Drawing Figures

CONTROL OF A SUPPORT FILAMENT FOR OPTICAL WAVEGUIDES

This invention relates to the control of a support filament for optical waveguides and is specifically concerned with the reduction in twist of a sinusoidally grooved filament while waveguides are being applied thereto.

Suggestions have been made in the manufacture of optical cable, to locate optical waveguides in a grooved support filament. As explained in U.S. Pat. No. 4,205,899, issued June 3, 1980 to F. D. King and T. S. Swiecicki, and entitled "Improvements in Optical Cables", it is desirable for the grooves to follow the form of a helix and to change hand along the filament. In practice, it is convenient to extrude the grooved filament and store it upon reels and then to draw the filament from the reels to pass it through apparatus for laying optical waveguides into the grooves.

The waveguides are laid into the grooves by passing them through guideplates or laying units as described in U.S. Pat. No. 4,195,468, issued Apr. 1, 1980 to F. D. King and T. S. Swiecicki and entitled "Apparatus and Method For the Manufacture of Optical Cables".

It has been found that the reeling and unreeling procedure imposes a twist onto the filament. In the main, twist appears to be placed on the filament in one direction at one axial end of a reel and in the other direction at the other axial end of the reel. The twist results in an increase in the angular progression of the grooves around the filament, from one groove peak position to another. This increase may be sufficiently large that the waveguides, which follow the position of the grooves as they pass through a laying unit, are caused to wrap around the filament before they reach the laying unit. This results in breakage of waveguides and undesirable ravelling of waveguides together. Hence, production has to be stopped to place the waveguides along desirable paths and mend any breakages.

Similar problems would exist if electrical conductors were laid in along the grooves, to be used for telecommunications purposes. Optical waveguides and electrical conductors will be referred to generally throughout this specification and the claims as "elongate transmission elements".

The present invention provides a device for limiting the amount of twist in a support filament as elongate transmission elements are being laid into grooves which are sinusoidal, this latter term also including grooves of truly helical form which change hand along the filament.

Accordingly, the present invention provides a device for limiting the amount of twist in a support filament for elongate transmission elements as the elements are being laid in grooves extending sinusoidally along the filament, the device comprising:
 a housing;
 an arcuate groove follower in the shape of at least part of a circle and rotatably mounted upon the housing to rotate about the major axis of said circle while defining a passage along the axis for movement of the support filament, and comprising at least one groove follower probe extending inwardly of the follower towards said major axis for location within a groove of the support filament and effect rotational movement of the follower dependent upon the sinusoidal groove movement as the filament passes the probe; and
 rotation limiting means associated with the housing and the follower to limit rotational movement of the follower between one angularly spaced limit position and another to thereby restrict twist of the filament.

In a practical construction, the groove follower is annular and the passage for movement of the support filament is the aperture defined within the annulus.

Preferably, the device for limiting the twist also operates as a laying unit for laying elongate transmission elements in grooves of the support filament. In this case, there is a groove follower probe for each groove in which elements are to be laid, and each probe is a guide needle for guiding elongate transmission elements into its associated groove. Preferably, each needle may be of the construction described in aforementioned U.S. Pat. No. 4,195,468, in that it has an aperture at its radially inner end through which an elongate transmission element is to be passed as it is guided into the groove. Alternatively, each needle is in the form of a tube through which a waveguide is to be passed for instance as described in aforementioned U.S. Pat. No. 4,205,899.

The invention also includes a laying apparatus for an elongate transmission element comprising a device for limiting the amount of twist of a support filament as defined according to the invention above, the device being disposed with said major axis substantially coinciding with a feed path for a support filament to be fed through the apparatus.

The laying apparatus may include a laying unit for laying in elongate transmission elements which is separate from the twist limiting device. It is preferable that the laying unit is disposed downstream along the feed path from the twist controlling device to ensure that the probes are located within the grooves prior to insertion of the transmission elements, hence avoiding damage to the transmission elements by the probes.

Preferably, however, the laying apparatus comprises a laying unit which also operates as a twist limiting device for a support filament. This laying unit comprises an annular groove follower defining an aperture about its major axis for movement therethrough of the support filament, the groove follower having a plurality of groove follower and laying needles extending radially inwardly of the follower for location within grooves of the support filament to effect rotational movement of the follower dependent upon the sinusoidal groove movement as the filament passes through the aperture, and the needles having guide passages opening within the aperture to receive and guide elongate transmission elements into the grooves of the filament, the apparatus also including a rotation limiting means for the groove follower as defined above.

The invention further includes a method of laying elongate transmission elements into sinusoidal grooves formed in a support filament comprising guiding the transmission elements into the grooves while simultaneously limiting the amount of twist of the support filament in a region where the transmission elements are guided into the grooves.

One embodiment of the invention will now be described, by way of example, with reference to the accompanying drawings in which.

Figure 1:
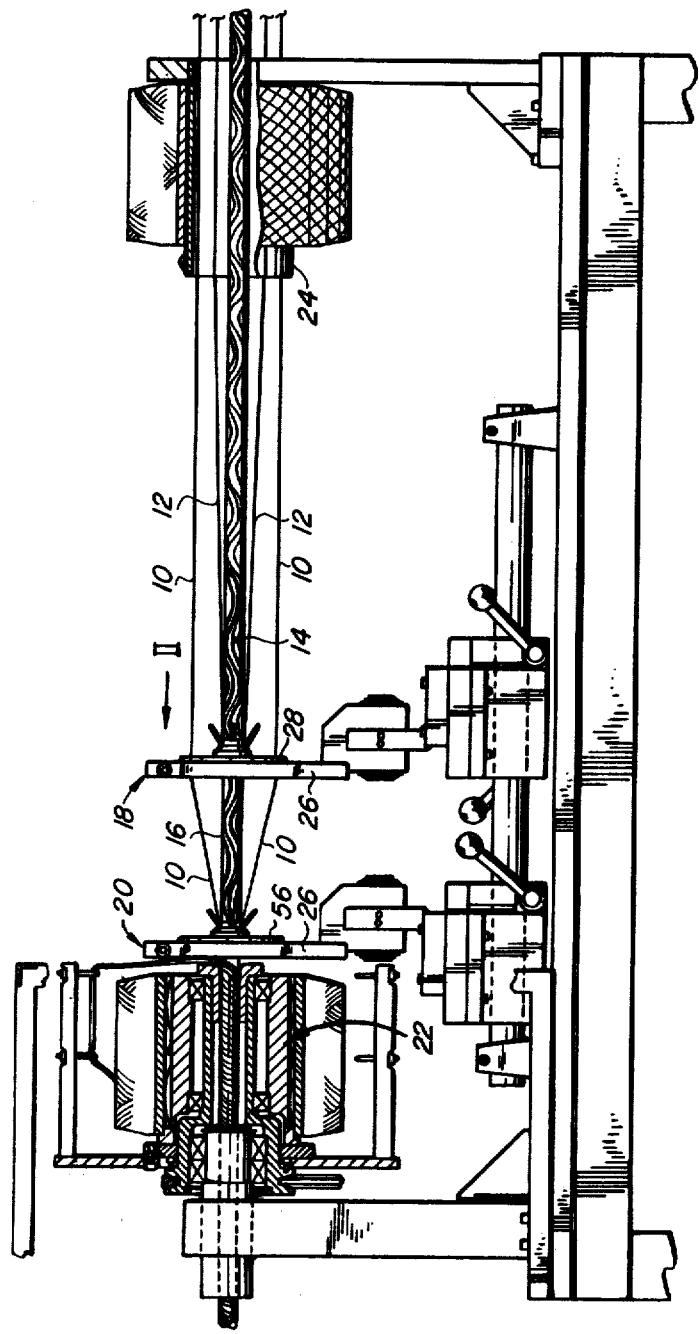
FIG. 1 is a side elevational view, partly in cross-section, of apparatus for laying optical waveguides and electrical conductors into grooves of a support filament.

In the embodiment, as shown by FIG. 1, apparatus for laying optical waveguides 10 and electrical conductors 12 into sinusoidal grooves 14 of an extruded plastic support filament 16 comprises two laying structures 18 and 20 for the waveguides and conductors. Although six waveguides and six conductors are laid into grooves 14, only upper and lower ones are shown in FIG. 1 for clarity. The waveguides and conductors have individual protective or insulating coatings thereon. Downstream of structures 18 and 20 is disposed a binding tape spool support means 22, and upstream is located a replacement spool support means 24. The construction of the structures 18, 20 and of the means 22 and 24 is as described in a copending application Ser. No. 208,565, filed Nov. 20, 1980, entitled "Laying and Binding Optical Waveguides Onto A Support Filament" and in the name of Miguel Fombellida.

The filament 16 is fed from a supply reel (not shown) and through the support means 24. As it passes through the structure 18, the conductors 12 are applied to the filament, followed by the optical waveguides in structure 20. This two stage application of conductors and waveguides is described in a copending application Ser. No. 208,567, filed Nov. 20, 1980, entitled "Laying Optical Waveguides and Electrical Conductors Onto A Support Filament" in the name of Tomasz Stanislaw Hope.

As the filament passes from the reel and along its feed path through the apparatus, a stored twist in the filament tends to increase the angular progression around the filament from one groove peak to another and where this progression is sufficiently large, the waveguides and conductors which follow the angular position of the grooves as they pass through structures 18 and 20 would tend to ravel together and break unless steps are taken to prevent this. This invention is concerned with this prevention by limiting the degree of twist of the filament as will now be described.

Figure 3:
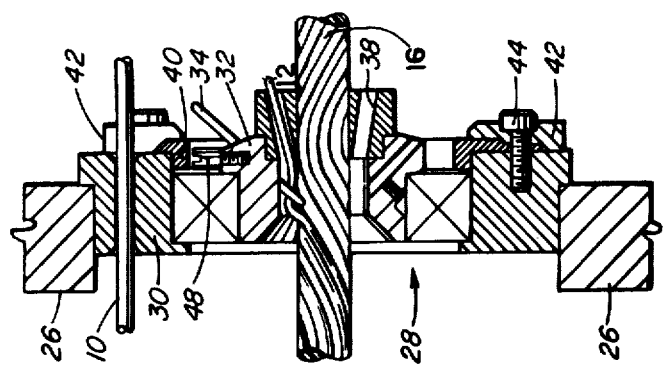
FIG. 3 is a cross-sectional view of the laying unit along line III—III in FIG. 2.
Figure 2:
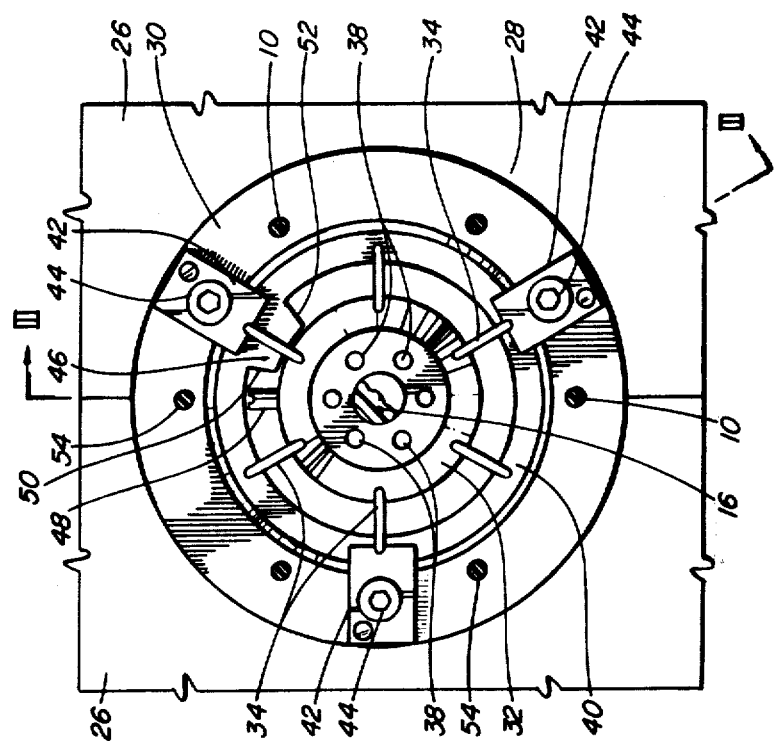
FIG. 2 is a view in the direction of arrow II in FIG. 1, and on a larger scale, showing a laying unit of the apparatus.

As shown in FIGS. 1, 2 and 3, the structure 18 comprises two yokes 26 which grip between them, a laying unit 28. Detail of this gripping arrangement is as described in the aforementioned copending application Ser. No. 208,565, entitled "Laying and Binding Optical Waveguides Onto A Support Filament".

The laying unit 28 comprises an annular housing 30 within which is rotatably mounted an annular groove follower 32. The follower 32 is provided with six groove follower needles 34, (one being shown in FIG. 3), equally spaced apart around the major axis of the annular follower and inclined to the axis with their radially inner ends lying downstream of the feed path of the filament. The inner ends extend radially inwardly of the follower 32 and project into the central aperture 36 to engage within the grooves of the filament as this moves along its feed path through the aperture. The needles thereby form groove follower probes which cause the follower 32 to rotate alternately in one direction and then the other by virtue of the angular disposition of the parts of the grooves engaged by the needles.

Inner ends of the needles are formed with apertures through which the electrical conductors are fed after being passed through orifices 38 of the follower 32, as shown in FIG. 3. The conductors are thereby fed into certain of the grooves 14 as shown by that Figure.

The unit 28 also acts as a twist limiting device for the filament 16 and for this purpose, rotation limiting means is provided to prevent rotation of follower 32 by more than a predetermined amount. This limiting means comprises a stop ring 40 adjustably held in position concentrically on housing 30 by holding means in the form of three spaced locking plates 42 and, bolts 44 screwed into the housing. The plates 42 overlap a flange of the stop ring (FIG. 3) to lock it against the housing. The stop ring is formed with first stop element means in the form of a radially inwardly projecting stop element 46 which terminates short of the follower 32. The limiting means also includes a second stop element means in the form of a stop pin 48 extending outwardly of the follower 32 and lying in the same circumferential plane as the element 46. Hence during rotation of the follower 32, further rotation in one direction or the other is prevented upon engagement of one of the side edges or stop surfaces 50 or 52 of element 46 by the stop pin 48.

Figure 4:
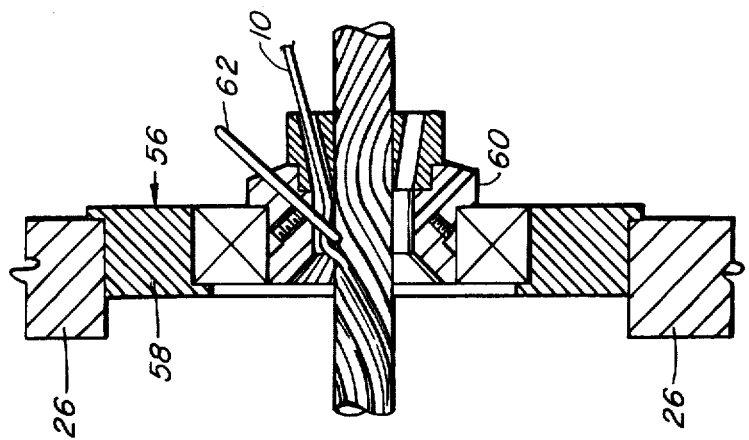
FIG. 4 is a cross-sectional view of another laying unit of the apparatus.

The laying unit 28 also includes a ring of holes 54 for passage of waveguides 10 as they proceed to a laying unit 56 of structure 20 as shown in FIG. 1. The unit 56 (FIG. 4) is basically of similar construction to unit 28 in that it has a housing 58 and annular groove follower 60 with needles 62 (one only being shown) for guiding waveguides into grooves 14 of the filament passing through. The unit 56 does not, however, act as a twist limiting device for filament 12 and is, therefore, devoid of a rotation limiting means, by which it differs from unit 28.

In use of the apparatus, with the filament 16 moving along its passline, the conductors 12 and waveguides 10 are fed into the grooves of the filament by the units 28 and 56.

At the beginning of operations, the bolts 44 are slackened off to permit angular adjustment of the stop ring 40. The filament 12 is run through the apparatus for a short period to determine the best angular position of the stop ring consistent with the pin 48 engaging the stop element 46 on the edges 50 or 52 substantially towards the end of any twist on the filament in both directions of twist. The stop ring is then locked into position.

It is found that as the filament is wound from one axial end of the reel, any twist is in one direction and the follower 32 may oscillate around its major axis around one part of its limited movement so that the stop pin 48 will engage one edge (e.g. edge 50) of the stop element. As the filament is wound across the reel and from the other side, it may be found that the pin will engage the other edge 52 instead. Upon the pin engaging either edge, however, because of the twist in the filament turning the follower 32, it is found, surprisingly that any further stored twist in the filament does not place undue strain upon the follower or bend the needles. It is found that instead of the grooves in the filament controlling the angular position of the follower 32 at this point, the needles in being prevented from turning any further, retain their positions in the grooves and the stored twist in the filament is reduced by an untwisting movement of the filament. Hence, prevention in further rotation of the follower 32 is transmitted through the grooves to cause untwisting of the filament until a peak position of the sinusoidal grooves has been passed by the needles.

The result of this is that the grooves are not rotated around the axis of the laying unit beyond their limiting angular peak positions as the conductors 12 are being laid in. Thus, the conductors are not turned around the axis a sufficient distance to cause them to ravel together or to become entwined with the filament prior to their passage through the unit 28.

It is also found that upon the stored twist in the filament being reduced by the rotation limiting means described above, the degree of twist does not increase again, or sufficiently, to cause ravelling or intertwining of the optical waveguides before they reach the unit 56.

Figure 5:
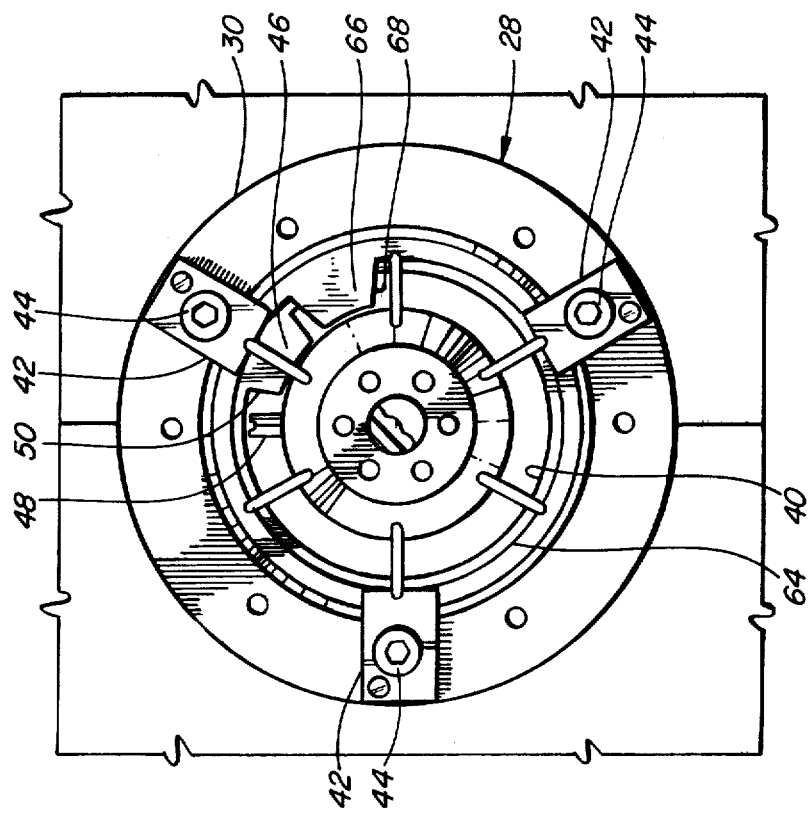
FIG. 5 is a part view, similar to FIG. 2 of a modification.

In a modification of the embodiment shown in FIG. 5 in which parts similar to those in the embodiment have the same reference numerals, the rotation limiting means of the unit 28 incorporates in addition to stop ring 40, a further stop ring 64 with its own inwardly projecting stop element 66. The stop elements 46 and 66 form the first stop means. Each stop ring is independently adjustable upon housing 30 to independently determine the two limit positions of rotational movement of the follower 32. The limit positions are set by engagement of stop pin 48 with the two furthest spaced stop elements, i.e. side edge 50 of the element 46 and side edge 68 of element 66.

What is claimed is:

1. A device for limiting the amount of twist in a support filament for elongate transmission elements as the elements are being laid in grooves sinusoidally along the filament, the device comprising:
    a housing;
    an arcuate groove follower in the shape of at least part of a circle and rotatably mounted upon the housing to rotate about the major axis of said circle while defining a passage along the axis for movement of the support filament, and comprising at least one groove follower probe extending inwardly of the follower towards said major axis for location within a groove of the support filament and effect rotational movement of the follower dependent upon the sinusoidal groove movement as the filament passes the probe; and
    rotation limiting means associated with the housing and the follower to limit rotational movement of the follower between one angularly spaced limit position and another to thereby restrict twist of the filament.

2. A device according to claim 1 wherein the groove follower is annular and the passage for movement of the support filament is the aperture defined within the follower, and there are a plurality of probes spaced apart around the follower.

3. A device according to claim 2 wherein one at least of the probes is a guide needle formed with a passageway for guiding an elongate transmission element therethrough and laying it into a groove of the filament.

4. A device according to claim 3 wherein the passageway is formed as an aperture at the radially inner end of the needle.

5. A device according to claim 3 wherein the guide needle is a tube.

6. A device according to any of claims 1, 3 and 4 wherein the rotation limiting means comprises a first stop element means projecting radially inwards from the housing and a second stop element means extending radially outwards from and secured to the follower, and being rotatable with the follower, the limit positions being determined by engagement of the second stop element means with one of two circumferentially spaced stop surfaces of the first means.

7. A device according to claim 1 wherein the rotation limiting means comprises a stop ring which is formed with a first stop element means projecting radially inwards from the housing, the stop ring being rotatable upon the housing to determine a desired angular position of the first stop means, holding means to secure the stop ring in its desired position upon the housing, and a second stop element means extending radially outwards from and secured to the follower and being rotatable with the follower, the limit positions being determined by engagement of the second stop element means with one of two circumferentially spaced stop surfaces of the first means.

8. A device according to claim 7 provided with two stop rings each of which is formed with a first stop element of the first stop element means, both stop rings being rotatable upon the housing to determine the desired angular position of each of the first stop elements, the limit positions being determined by engagement of the second stop element means with the two furthest circumferentially spaced stop surfaces of the two first stop elements.

9. A device according to claim 7 wherein the holding means comprises a plurality of locking plates spaced around the housing and bolts to secure the plates to the housing and secure the stop ring between the plates and the housing.

10. A device for limiting the amount of twist in a support filament for elongate transmission elements as the elements are being laid in grooves extending sinusoidally along the filament, the device comprising:
    an annular housing;
    an annular groove follower rotatably mounted upon the housing, the follower defining a central aperture for movement therethrough of the support filament, and the follower having a plurality of groove follower probes spaced-apart around the follower and extending inwardly towards the major axis of the follower for location within grooves of the filament and effect rotational movement of the follower dependent upon the sinusoidal groove movement as the filament passes the probes, and some at least of the probes being guide needles formed with passageways for guiding elongate transmissions elements therethrough and laying them into grooves of the filament; and
    rotation limiting means for the follower, said means comprising a stop ring formed with a first stop element means projecting inwardly from the housing, the stop element means rotatable upon the housing to determine a desired angular position of the first stop means, holding means to secure the stop ring in its desired position upon the housing, and a second stop element means extending radially outwards from and secured to the follower and rotatable with the follower, rotational movement of the follower being limited between angularly spaced limit positions determined by engagement of the second stop element means with one of two circumferentially spaced stop surfaces of the first means.

11. A laying apparatus for an elongate transmission element comprising a device for limiting the amount of twist of a support filament according to claim 2, the device being disposed with its major axis substantially coinciding with a feed path for a support filament through the apparatus.

12. A method of laying elongate transmission elements into sinusoidal grooves formed in a support filament comprising guiding the transmission elements into the grooves while limiting to a predetermined amount the maximum angular progression of each groove from one peak position to another in a region where the transmission elements are guided into the grooves to thereby limit the twist of the support filament in said region, said predetermined amount consistent with enabling the filaments to be guided unhindered into the grooves.

* * * * *